United States Patent [19]

Durkee

[11] 4,304,599

[45] Dec. 8, 1981

[54] HEAVY METAL REMOVAL PROCESS

[76] Inventor: Richard G. Durkee, 3616 W. Pendleton, Santa Ana, Calif. 92704

[21] Appl. No.: 173,321

[22] Filed: Jul. 29, 1980

Related U.S. Application Data

[62] Division of Ser. No. 115,039, Jan. 24, 1980.

[51] Int. Cl.³ ............................................. C22B 15/12
[52] U.S. Cl. .................................. 75/109; 75/101 R; 75/117
[58] Field of Search ................ 266/101 R, 170, 79, 266/81; 75/109, 117, 99

[56] References Cited

U.S. PATENT DOCUMENTS

| | | | |
|---|---|---|---|
| 705,589 | 7/1902 | James .................................. | 266/170 |
| 1,349,086 | 8/1920 | Murphy ................................ | 266/170 |
| 3,301,542 | 1/1967 | Medford et al. ..................... | 266/101 |
| 3,748,124 | 7/1973 | Case et al. ........................... | 75/121 X |
| 3,840,365 | 10/1974 | Hammes et al. ..................... | 75/117 X |
| 3,905,827 | 9/1975 | Goffredo et al. .................... | 75/117 X |

*Primary Examiner*—G. Ozaki

*Attorney, Agent, or Firm*—Thomas A. Turner, Jr.

[57] ABSTRACT

A gravity fed water bath process treats waste water from spray rinses containing compounds of copper and like heavy metals. For displacing heavy metals, such as copper, the bath has a substantially pure metal with an electrode potential greater than the heavy metal contained in the rinse water. A system for controlling the pH level of the water bath treatment and for supplying acid at the beginning of the bath, and alkaline at the end of the bath provides a highly acidic pH level for the water bath and heavy metal removal chamber, and adjusts the pH level of the discharged water for satisfactory deposit in municipal sewer systems.

A method for displacing the heavy metal from the compound in solution requires exposing the heavy metal compound to a substantially pure metal having an electrode potential greater than the heavy metal of the compound, in an acidic bath whose pH level is controlled. The control of the pH is accomplished by acid sensing probes connected in circuit with a valve control which injects and mixes acid in the bath of a treatment chamber.

15 Claims, 4 Drawing Figures

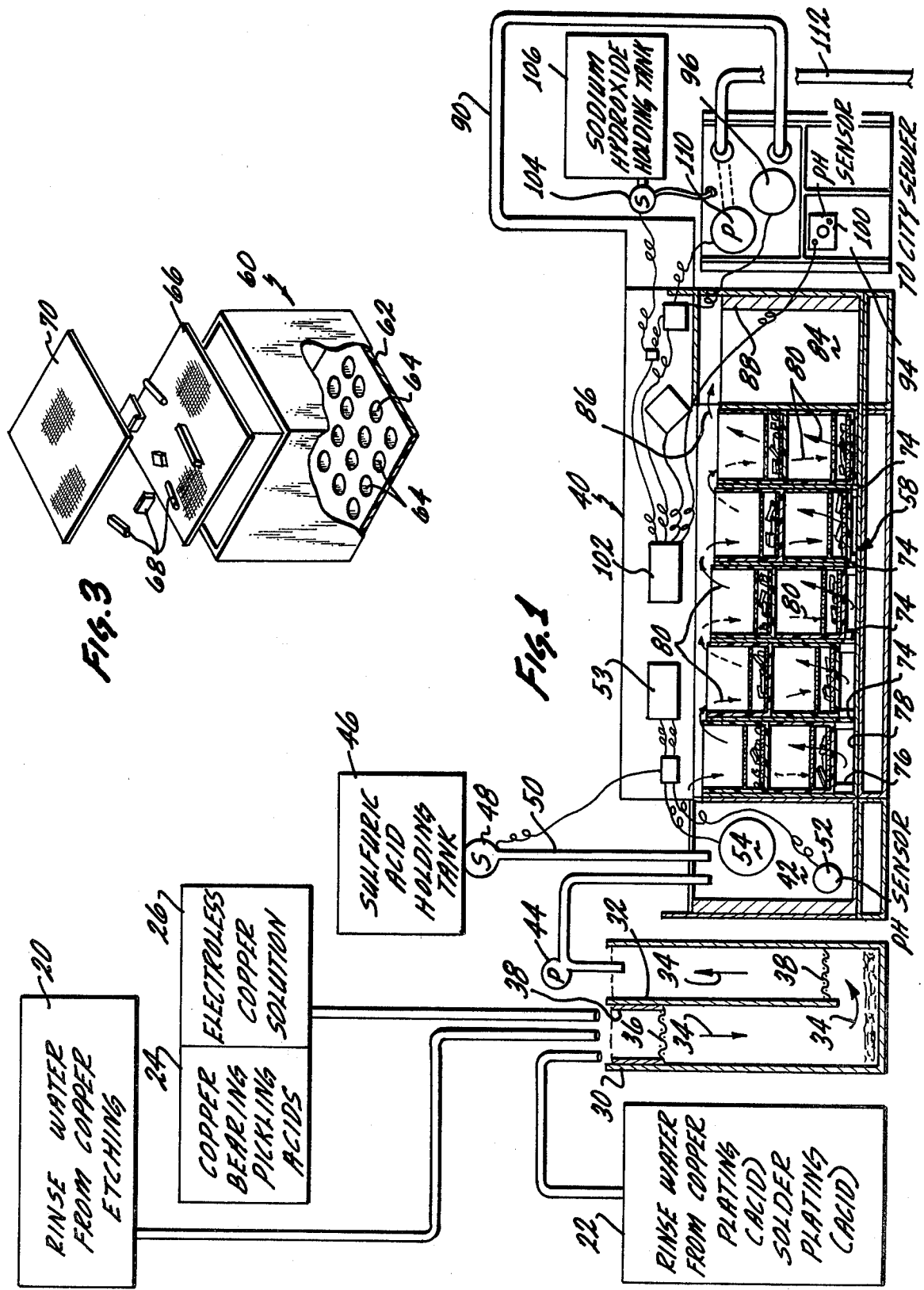

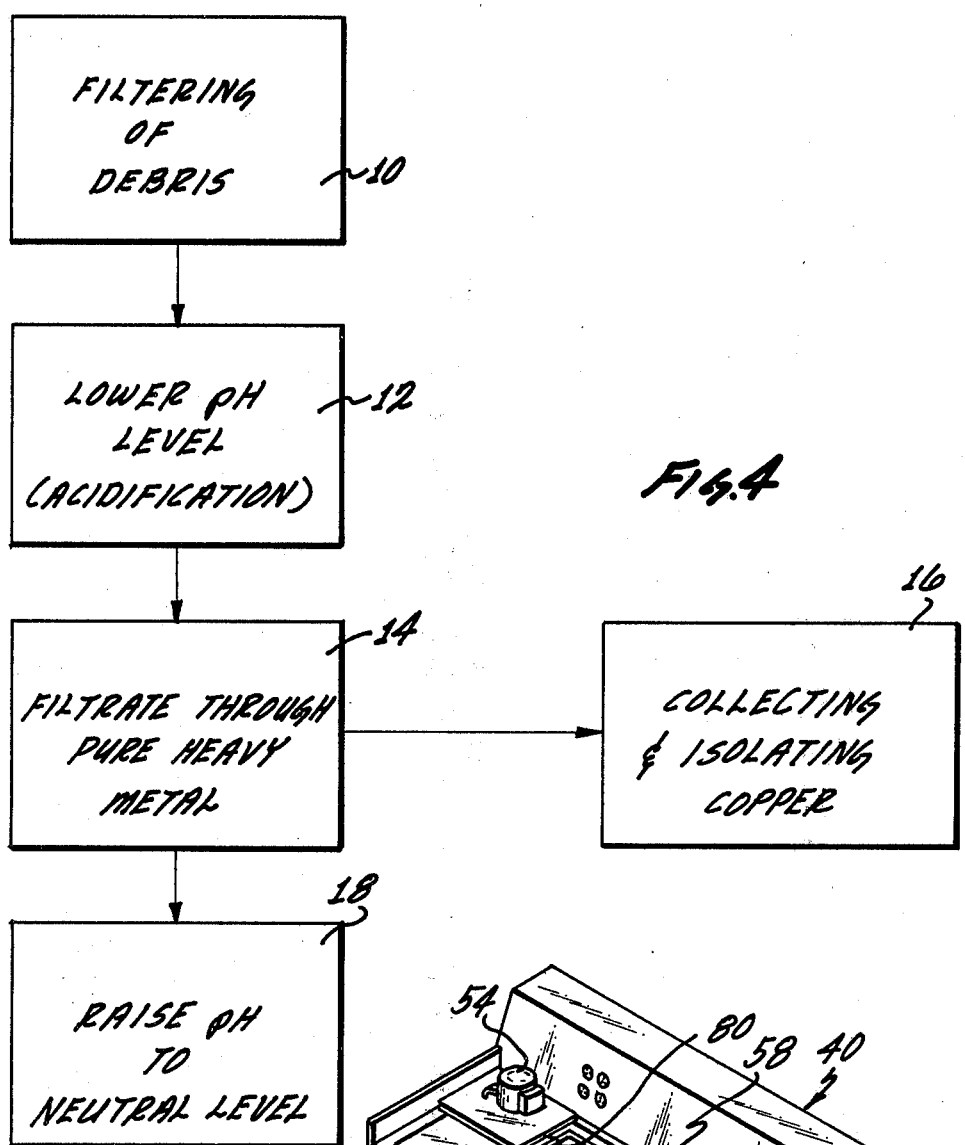

HEAVY METAL REMOVAL PROCESS

This is a division, of application Ser. No. 115,039, filed Jan. 24, 1980 for HEAVY METAL REMOVAL APPARATUS AND PROCESS.

BACKGROUND OF THE INVENTION

1. Field of the Invention

The present invention relates to the art of treating heavy metal-bearing aqueous solutions used in plating and metal finishing processes, and more particularly relates to the reduction or displacement of poisonous heavy metals such as copper from waste waters for preparing the waste water prior to discharge in municipal sewers.

2. Description of the Prior Art

Heavy metal plating is accomplished frequently by an aqueous solution or both process which can be electrolytic or electroless. In almost all cases, high concentrations of the heavy metal are maintained. If the heavy metal is poisonous, such as, for example, copper (Cu), or is otherwise objectionable, problems are presented when excess solutions must be discharged. For example, copper and copper-bearing compounds are usually not permitted above limited concentrations in municipal sewer systems, and therefore the copper must be reduced below the concentration limits. In the case of metal hydroxides, for example, a common method of reducing concentration is precipitation. Hereinafter in this specification and in the claims, the term "precipitate" will be used to mean the separating in solid form of a substance from a liquid as the result of a chemical or of a physical change, as from the addition or subtraction of electrons or electron energies. An attempt is made to collect the precipitate in a filter and to deposit the filtrate in municipal dumps. This method of elimination is unsatisfactory and only partially successful, because the metal hydroxide dissolves and percolates back into the underground water table. Another method of reducing concentration amounts is to add very substantial amounts of water.

Heavy metal plating techniques are used often in the manufacture of printed circuit boards. Printed circuit boards and printed wire boards are manufactured in the United States principally by photographic techniques at the present time. These techniques involve the plating of the substrate fiberglass or silicon with an electrically conductive metal, frequently copper (Cu), which covers the entire circuit board. Photographic etching techniques are then employed to remove the coppper from the areas of the board which are intended to be nonconductive in accordance with a circuit pattern predetermined by the design engineer.

The copper is removed by etching techniques which frequently call for covering the copper-plated circuit board only over those particular areas which are to be conductive, thus exposing the copper in the plated area which is to be removed. Acid or alkaline etchants are used to etch the exposed copper. The etched copper, very often in the form of copper sulfate ($CuSO_4$), is rinsed away in solution by a flush or rinse of water. Hereinafter in this specification, the term water will be used to mean any liquid or fluid effluent comprising heavy metal or other contaminants, unless it is indicated that this means otherwise.

Copper is poisonous, and the discharge of water containing any substantial amount of copper in the municipal sewer system frequently subjects the manufacturer to stiff penalties. In addition, the environmental systems of the watersheds and water bodies receiving the effluent are quite detrimentally altered. The customary method in the industry of removing the copper is to introduce great amounts of alkaline as may be necessary. Alkaline reduces the $CuSO_4$ to copper-hydroxide ($Cu(OH)_2$). The $Cu(OH)_2$ is fluffy in water, and forms a slime on the bath chamber. Some solutions of $CuSO_4$ and alkaline sulfate double salts such as $KCuSO_4 \cdot 6H_2O$ may also be poisonous. The fluffy slime mentioned hereinabove concerns conservationists and environmentalists when it appears in the municipal effluent.

In its pure, anhydrous form, $CuSO_4$ is a colorless salt which readily absorbs water to form the blue pentahydrate ($CuSO_4 \cdot 5H_2O$) known as "blue vitriol." Copper is very poisonous in all of its forms to low organisms, especially algae, and is used in controlled amounts in swimming pools and water works to prevent the growth of such organisms.

It has long been desired to have a process for removing such objectionable heavy metal from the bath water in industrial systems, and which reduce water requirements. It has further been sought to remove such objectionable heavy metal while leaving a substantially clear liquid having essentially a neutral pH without fluff, slime and similar debris, so that the substantially clear neutral and non-poisonous liquid can be drained into municipal sewer systems without endangering the environment or subjecting the plant to severe sewer fines.

SUMMARY

In brief, in accordance with one aspect of the present invention, a method of removing copper from the etch rinse in a printed circuit board manufacturing process is described. The rinse water from copper etching, copper plating and solder plating processes, as well as the water from copper bearing pickling acids and electroless copper solutions are collected in a chamber which initially filters debris from the liquid. The rinse water containing substantial amounts of copper-bearing compounds, is collected in a mixing tank where the pH level is lowered substantially by the addition and blending of sulfuric acid ($H_2SO_4$). Probes capable of sensing the pH, valve the flow of sulfuric acid to the blending chamber or mixing tank.

After adjusting the pH of rinse water, making it highly acidic, the rinse water flows into a displacement chamber in a path for approximately three hours. In this flow, the rinse water filtrates over substantially pure metal aluminum. The copper is replaced by aluminum in the sulfate compound, and the copper precipitates as pure metal copper to the bottom of the displacement chamber. The water is then discharged into a second mixing tank.

The second mixing tank may be a collection tank for not only the copper removal process described here, but also for the effluent from other processes in the plant. The second mixing tank is the last processing of the rinse water prior to its discharge into the municipal sewer system. In this second mixing tank, the pH is raised to a neutral level by the addition of sodium hydroxide (caustic) from a conveniently placed caustic (NaOH) holding tank. A pH sensing probe controls a valve which regulates the flow of NaOH into the collected effluent. The effluent from the collection chamber is pumped or otherwise directed into the sewer system in a substantially copper-free, acid neutralized water which is reasonably clear, free of slime and generally within standard municipal sewer acceptability guidelines.

An apparatus for carrying out the copper reclaiming process is described having a displacement chamber wherein the liquid can filtrate in a relatively small space for approximately three hours over relatively pure metal tailings held at various predetermined points along the flow path. Initially, a relatively deep collecting chamber receives the rinse water from the copper etching, copper plating and solder plating processes, and filters the masks, fiberglass chips and other debris before the liquid is pumped to an acidifying and mixing chamber. The liquid flows from the acidifying and mixing chamber into the displacement chamber where it follows a generally labyrinthine path to filtrate over the relatively pure metal tailings by gravity feed. A trough underneath the displacement chamber collects the pure metal copper being displaced in the process. A splash guard protects the area surrounding the displacement chamber, and directs the liquid to a second mixing chamber. The second mixing tank collects the filtrated water.

Probes sensing the pH in both of the mixing chambers or tank control valves to add chemicals for adjusting the pH level. The valve leading from a sulfuric acid holding tank to the acidifying and mixing chamber constantly maintains the liquid in the acidifying chamber at a pH of approximately 1.5 to 2.5. The mixing tank receiving the liquid from the displacement chamber has its pH raised to approximately neutral levels by the addition of caustic from a conveniently located holding tank. A solenoid valve connecting the caustic holding tank to the second mixing tank is controlled by electronic signals from the pH sensing probes.

Blending equipment is placed in each of the mixing tanks for blending the chemical, either acid or caustic, for achieving a more uniform pH throughout the tank. Pumps may assist the liquid in the final mixing tank to the city sewer system.

The aluminum or other relatively pure metal tailings are held in a box made from plastic that is inert relative to the metal which it contains, and inert with regard to the acids and the acidic nature of the liquid going through the displacement chamber. The box contains a grated flooring over which the tailings are placed, so that the liquid will flow through the grates and the tailings to filtrate, maximizing the surface area of relatively pure metal exposed to the $CuSO_4$-bearing liquid.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is an elevational cross-section of a displacement chamber, and a partial, schematic block diagram illustrating the preferred embodiment of the present invention;

FIG. 2 illustrates in a perspective view the preferred embodiment of an apparatus for displacing copper in the present invention.

FIG. 3 is an exploded, partially cutaway view in perspective showing a relatively pure metal retaining box of the preferred embodiment of the invention; and FIG. 4 is a block diagram indicating the method of the present invention in schematic, block form.

DESCRIPTION OF THE PREFERRED EMBODIMENT

A system and apparatus is illustrated for removing or reclaiming copper from copper compounds in solution in the rinse water from copper etching, copper plating and solder plating processes in printed circuit board manufacturing techniques, reference being had initially to FIGS. 1 and 2. The rinse water from the copper etching process 20, and the rinse water from the copper plating and solder plating processes 22 are collected in a collecting chamber 30. Other residual and waste liquids containing copper, such as copper bearing pickling acids 24 and the electroless copper solutions 26 in the printed circuit board manufacturing process, are also collected in the chamber 30.

Collecting chamber 30 comprises a tank having a baffle 32 separating it into substantially two sections. The copper-bearing liquids will be introduced to the chamber 30 in one of the sections, and pumped out of the other section into the reactive chamber 40, which will be described in greater detail below. The flow of water through the collecting chamber 30 is indicated generally by the arrows 34.

In the intake section of the chamber 30, a wire mesh screen 36 is situated approximately one foot into the chamber for the purpose of collecting fiberglass chips, mask debris and other trash which may find its way into the rinse water flow. Preferably, the screen 36 is part of a removable basket 38 so that the filtering screen 36 can be cleaned periodically. If desired, additional filtering screens, such as screen 38, can be placed in the flow 34 through the chamber 30.

The rinse water is then pumped by pump 44 into a mixing tank 42 in the reactive chamber 40. Mixing chamber 42 receives sulfuric acid from a sulfuric acid holding tank 46 through valve 48 and conduit 50. A pH sensing probe 52 provides electrical signals corresponding to the pH which are fed back to a pH meter and controls 53 which actuate the opening of valve 48. Thus, as the pH sensing probe senses more or less acid, the valve 48 is correspondingly closed or opened to maintain a desired pH level in tank 42. The pH sensing probe 52 and acid valve control system 53 are standard apparatuses conventionally available, and will not be described in any further detail herein, as it is considered that those skilled in the art are well aware of the operations of the sensing probes and valve control.

Blending equipment, marked "mixer" 54 is positioned within the mixing chamber to mix or blend the acid with the rinse water. The acidified rinse water then spills over into the displacement chamber 58. The displacement chamber comprises a series of tandem arranged boxes 60, a representative example being more particularly shown in FIG. 3 of the drawings in an exploded view. Each individual box 60 has a grated bottom 62 having holes 64 through which the liquid can pass. Resting on top of the grated bottom 62 is a sieve 66, such as screen mesh. Aluminum tailings 68 are sandwiched between sieve 66 and a covering screen mesh 70.

The displacement chamber 58 contains twenty such boxes 60 in five rows of four each, arranged two high. Each successive row is positioned slightly lower than the next preceding row so that the rinse water flowing from one row to the next will flow by gravity feed over the top of the baffles 74. The vertically tandem boxes 60, seen best in FIG. 1, rest on elevating blocks 76 to create a space or trough between the grate 62 of the lowermost box 60, and the floor 78 of the displacement chamber 58.

In each row, the rinse water flows down one column of vertically tandem boxes 60, and up the adjacent column. It is from this next adjacent column that the rinse water flows to the next lower row of boxes in the series to create a flow path denoted by the arrows 80. The aluminum tailings 68 held in the bottom of each box 60 are thus held at predetermined positions along the flow path 80.

In an experimental installation in an operating manufacturing plant, the displacement chamber 58, through which some 2000 gallons per day of contaminated water is processed, held approximately 230 gallons of water. In a standard shop, a maximum of 1.5 gallons per minute of water flow is usually considered sufficient to handle the heavy metal contaminated waste effluent, so that a complete flush through the displacement chamber 58 will take 2 hours and 45 minutes, or approximately 3 hours. Increasing the volume of the chamber and of the relatively pure metal, or increasing the temperature, will allow for a faster flow rate while maintaining the same amount of copper reduction. A more detailed explanation of the flow rate and displacement reaction will be given hereinbelow.

The rinse water flows through the space between the floor 78 and the lowermost box grate 62 once during the flow through each row. Copper being replaced by the aluminum settles to the floor 78 below the boxes 60, and thus is removed from the rinse water flow. The rinse water flowing into the final chamber 84, as indicated by arrow 86, is substantially free of very substantial amounts of the copper. A splash guard 88 may be provided to contain the rinse water within the reactive chamber 40.

The substantially copper-free rinse water is then directed into the plant's sewer system represented by conduit 90.

The copper-free rinse water collects into a second mixing tank 94. In the embodiment illustrated, selected waste water having principal concentrations of other metals from the printed circuit board manufacturing process is collected in tank 94. Similar to the acidification or mixing chamber 42, the tank 94 has a mixer 96 for blending the collected water. The tank 94 also has pH sensing probes 100 sending electrical signals corresponding to the pH level in the tank 94, to pH meter and valve controls 102. The pH meter and controls 102, similar to the pH meter and controls 53 for the acidification chamber 42, are standard devices available and known to those skilled in the art. The interior details will not be described further herein, except to note that the controls can be adjusted to regulate the liquid to any pH level desired.

The pH meter and controls 102 can operate the opening and closing of solenoid valve 104 for controlling the amount of caustic from the caustic or sodium hydroxide holding tank 106 going to tank 94. The collected waste water in tank 94 thus can have its pH regulated preparatory to being pumped or gravity fed into the city sewer. Optional pump 110 then pumps the waste water through conduit 112 into the external municipal sewer system or other waste disposal system.

In operation, rinse water containing principally copper sulfate, and possibly copper-ammonia complexes, cupric chlorides and electroless copper in solution are collected in collecting tank 30 after being strained through wire mesh 36 for filtering fiberglass chips, mask debris and other trash that might enter the rinse water. After passing under the baffle 32, further depositing debris on the floor of chamber 30, the filtered rinse water is pumped through pump 44 into the acidification and mixing chamber 42.

The pH sensing probes 52 convey electrical signals, corresponding to the pH level in the chamber 42, to the pH meter and controls 53, which in turn regulate the opening and closing of valve 48 controlling the acid introduced into the chamber 42.

It has been found that the most efficient acid is sulfuric acid, thus acidifying the rinse water solution to sulfate the copper. It is preferred that a pH of 1.5 to 2.5 be maintained in the acidification chamber 42, so that the rinse water flowing through the displacement chamber 58 will be highly acidic. Increasing acidity (lowering pH) increases the rate of copper precipitation. Slightly less acidity on the order of pH 3 has been found to achieve less than satisfactory results.

The rinse water then flows for approximately three hours in the flow path 80 in the displacement chamber 58. In this flow path, the highly acidic rinse water passes over aluminum tailings 68 held at predetermined points along the flow path 80 in boxes 60. It has been found that 10 lbs. of aluminum tailings for each cubic foot, where the boxes 60 are conveniently approximately a cubic foot, has been an adequate quantity to produce extremely good results. It has also been found that 20 lbs. per cubic foot of the tailings is too much, tending to reduce the amount of reaction with the copper sulfate. There is, it is believed, a point below 10 lbs. per cubic foot which will be too fine of a distribution of the aluminum tailings, so that there will be not enough contact of the copper sulfate with the aluminum tailings to produce meaningful results.

During one experiment, approximately 2,000 gallons were processed through the displacement chamber 58. Using the structure as defined hereinabove, the copper contained in the effluent to the city sewer was reduced in quantity to approximately 1.25 parts per million. The contamination of copper being treated was initially 800 parts per million. The water processed into tank 94 contained approximately 50 parts per million. The water so processed is combined with the remaining effluent from the shop in tank 94 before alkalinization and discharge into the municipal sewer. The total amount of effluent was approximately 80,000 gallons for the 24 hour period, so that the discharge contained approximately 1.25 parts per million. This quantity is considered to be negligible and no serious threat to living organisms.

It is not known precisely what chemical reaction occurs in the displacement chamber, but it is determined that approximately 95% or better of the copper in the rinse water is deposited on the floor 78 of the displacement chamber in substantially pure metal form. It is believed that the sulfuric acid attacks the pure metal aluminum to place in the solution aluminum ions having a valence of plus three. It is observed that hydrogen gas is given off through the top of the displacement chamber. The electrons from the aluminum supply the necessary electron energies to reduce the copper ions so that pure copper metal is formed and drops to the chamber floor 78.

It is believed that the formation of hydrogen gas prevents the copper from firmly attaching onto the aluminum, a frequent result when copper sulfate in solution is exposed to aluminum in an essentially neutral environment. Perhaps the hydrogen gas keeps the copper agitated in solution. Also, the hydrogen gas may form between the surface of the aluminum and the copper developing as a pure metal, to drop the copper and prevent it from plating on to the aluminum. Heating the bath in the displacement chamber 58 20° F. or more also increases the rate of copper precipitation.

The aluminum is depleted periodically by the process, and must be replaced. Standard laboratory procedures and tests can be employed to determine if the copper quantity in chamber 84 is such as to indicate that the process is no longer reducing the copper in the indicated amounts. One such test involves sampling chamber 84 and combining a like volume of the sample with concentrated ammonium hydroxide ($NH_4OH$). A distinctly blue color indicates a passage of copper and an exhaustion of the tailings 68. The retaining boxes 60 are easily removed from the apparatus so that fresh aluminum tailings or turnings 68 can be inserted between the sieve 66 and screen 70 over the grate 62. Increasing the quantity of aluminum in the tailings 68 increases the degree of copper precipitation, within the density limits indicated above.

Using hydrochloric acid produces an uncontrolled reaction, the results of which cannot be predicted. Phosphoric acid ($H_3PO_4$), while chemically suitable in laboratory experiments, is not the acid of choice because of its high cost and because its use results in adding phosphates to the waste water. Phosphates are objectionable in the municipal sewer systems and the environment. On the other hand, nitric acid ($HNO_3$) in experiments passivates the aluminum, placing an oxide coating over it.

FIG. 4 is a schematic, block diagram of the invention illustrating the essential steps of removing the copper from the copper compounds in the rinse water from copper etchings, copper plating and solder plating baths as well as copper from copper bearing pickling acids and electroless copper solutions resulting from printed circuit board manufacturing techniques. The copper compounds in this rinse water most frequently are in the form of copper sulfate, although copper-ammonium complexes and cupric chlorides as well as some electroless copper and formaldehyde copper may be found in the rinse water. In addition, the rinse water frequently will contain fiberglass chips and parts of the mask material used to mask these areas on the fiberglass substrate which are to remain conductive after the etching process.

Since the etching steps in the photographic copper plating techniques in printed circuit board plants are frequently open and exposed to workers, additional debris such as cigarette butts, trash and the like may be found in the rinse water. The rinse water is thus initially filtered, as indicated in block 10 of the schematic of FIG. 1. In the preferred embodiment, the rinse water is acidified 12, having its pH lowered to approximately between 1.5 and 2.5. The rinse water is then flowed or passed through essentially pure metal. This metal is preferably substantially pure aluminum, but could be other metals such as iron. While aluminum and iron are known to work, it is believed that any metal stable in an aqueous acid solution having a relative position on the electromotive force table of elements greater than copper, will alternatively achieve results. Experiments with iron and aluminum have shown that the speed and rate of reaction resulting in the precipitation of copper will depend on the relative activities of the metals. Among these metals believed to be useful are magnesium and manganese.

In the filtration process 14, the aluminum substitutes for the copper in the $CuSO_4$ compound, precipitating the copper in a substantially pure metal form 16. The resulting liquid having aluminum sulfate ($Al_2(SO_4)_3$) heavily in solution has the pH raised to a substantially neutral level 18 for disposing of it in the city sewer system. The copper can be reclaimed for its many industrial uses.

The foregoing detailed description of my invention in a preferred embodiment both as to apparatus and as to method is illustrative of several embodiments. It is to be understood, however, that additional embodiments may be perceived by those skilled in the art. Such additional embodiments, for example, would encompass the treatment of any highly concentrated heavy metal aqueous solutions such as spent plating baths or concentrated waste. The embodiments described herein together with those additional embodiments are considered to be within the scope of the present invention.

I claim:

1. A method of reclaiming heavy metal from a heavy metal finishing process, in an aqueous solution, comprising the steps of:
   a. acidifying the aqueous solution to a pH less than 2 to form a solution in heavy metal salt of the acid used to acidify the solution; and
   b. flowing the aqueous solution containing the heavy metal in a path including a supply of substantially pure metal aluminum tailings stable in the aqueous acid solution, the metal aluminum having a relative electrode potential greater than that of the heavy metal in the aqueous solution to precipitate said heavy metal in the aqueous solution.

2. The method of claim 1 further including the step of sensing the pH of the aqueous solution during the acidifying step, and injecting acid into said aqueous solution responsive to the sensed pH to regulate the pH of the aqueous solution before the flowing step.

3. The method of claim 2 wherein the heavy metal salt is a metal sulfate, and the acid is sulfuric acid.

4. The method of claim 1 wherein the tailings are maintained by grates forming the bottom of removable boxes positioned in a reaction chamber, said boxes being adapted to be removed and inserted into the reaction chamber.

5. The method of claim 1 wherein the step of flowing, the aqueous solution flows by gravity feed over the substantially pure metal aluminum stable in the aqueous acid solution.

6. The method of claim 1 further including the step of raising the pH of the aqueous solution after the step of flowing the aqueous solution over the metal stable therein.

7. The method of claim 6 wherein the pH is raised by mixing alkaline material in said aqueous solution.

8. The method of claim 6 further including the step of sensing the pH in the aqueous solution after the flowing step, and of injecting alkaline material into said aqueous solution responsive to said sensed pH in an amount sufficient to raise the pH to at least 6.0.

9. A method of purifying aqueous solutions in a process involving the etching of poisonous heavy metal salts in solutions in a rinse of the process after the etching step, comprising the steps of:
   a. acidifying the aqueous solution to a pH less than 2 to form in solution a heavy metal salt of the acid used to acidify the solution;
   b. exposing the acidic aqueous solution to a supply of aluminum metal stable in the acid aqueous solution and having a relative electrode potential greater than that of the poisonous heavy metal;
   c. displacing the poisonous heavy metal in metallic form by non-poisonous aluminum metallic cations of the aluminum metal stable in the acid aqueous solution and having an electrode potential greater than that of the poisonous heavy metal; and
   e. neutralizing the resulting aqueous solution by the injection of caustic.

10. The method of claim 9 further comprising the step of forming alum during the neutralizing step by the injection of caustic, regulating the pH by this injection of caustic to at least 6.0 preparatory to deposition of the treated aqueous solution into a public waste system.

11. The method of claim 9 further including the step of sensing the pH in the aqueous solution prior to the exposing step, and injecting acid into said aqueous solution responsive to said sensed pH to maintain the pH at a level of less than 2.

12. The method of claim 11 wherein the pH is maintained at a level of one or less.

13. The method of claim 9 further including the step of sensing the pH level in the aqueous solution after the exposing step, and injecting caustic into said aqueous solution responsive to said sensed pH, to adjust the pH to a level of at least 6.0.

14. The process of precipitating and reclaiming substantially pure metal copper in aqueous solution by exposing substantially pure metal aluminum tailings to said aqueous solution and agitating the solution at the surface of said aluminum by acidifying the solution to a pH less than 2 to prevent the formation of substantially pure metal copper plating on said aluminum.

15. The process of claim 14 wherein the copper in the aqueous solution is in the form of a copper compound, and further including the step of acidifying the aqueous solution with sulfuric acid such that the copper in solution is in the form of copper sulfate in solution.

* * * * *